United States Patent [19]
Babigan

[11] 3,772,450
[45] Nov. 13, 1973

[54] SCANNING APPARATUS UTILIZING A LASER BEAM

[76] Inventor: Raymond Babigan, 4805-45th St. N.W., Washington, D.C. 20016

[22] Filed: Mar. 30, 1972

[21] Appl. No.: 239,632

[52] U.S. Cl. .................................................. 178/7.3
[51] Int. Cl. ............................................. H04n 3/00
[58] Field of Search ...................... 178/7.3 R, 7.3 D, 178/6.7, 5.2; 331/94.5 A; 315/169 R; 250/199

[56] References Cited
UNITED STATES PATENTS

| | | | |
|---|---|---|---|
| 3,627,408 | 12/1971 | Fergason | 178/5.2 R |
| 3,700,805 | 10/1972 | Hanlon | 178/7.3 D |
| 1,894,042 | 1/1933 | Jenkins | 178/7.3 D |
| 3,448,458 | 6/1969 | Carlson et al. | 178/6.7 R |
| 3,575,602 | 4/1971 | Townes et al. | 250/199 |
| 3,531,685 | 9/1970 | Holz | 315/169 R |

Primary Examiner—Gareth D. Shaw
Attorney—Leo A. Rosetta et al.

[57] ABSTRACT

A scanning apparatus which utilizes a laser beam of the type which is capable of ionizing a gaseous medium, thus providing an electrically conductive path through the gas. The laser beam is deflected in any desired manner and is then connected to a source of electrical power. The deflected beam and thus the ionized path, is directed toward a phosphorescent screen. By varying or modulating the electric power in the ionized beam the intensity of luminescence of the spot on the screen which is struck by the beam is correspondingly varied.

6 Claims, 4 Drawing Figures

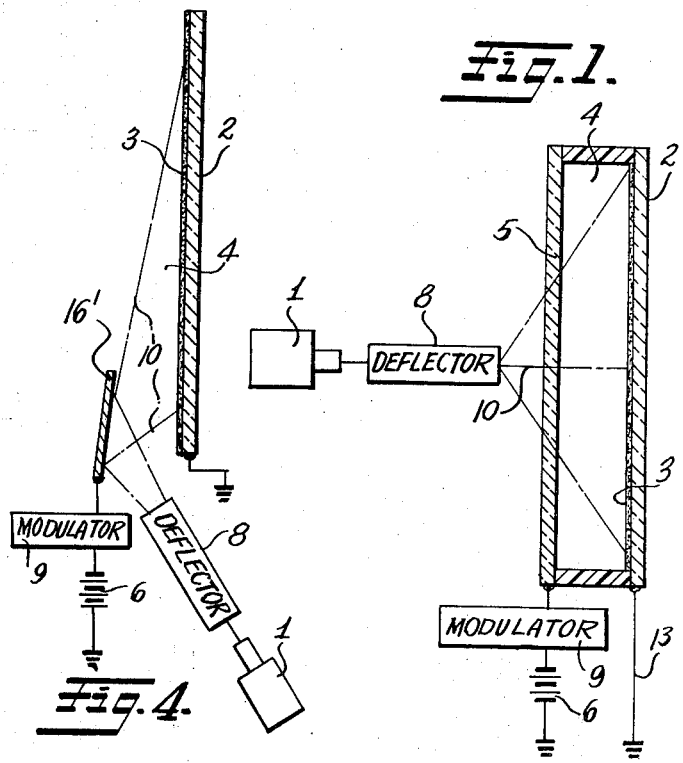
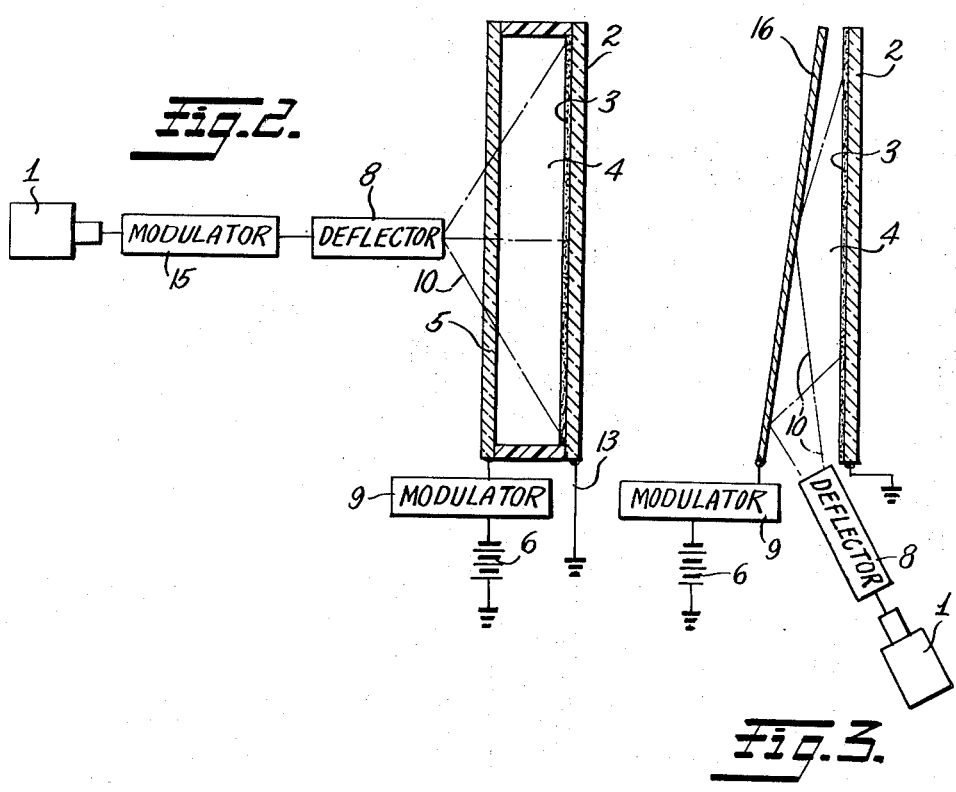

SCANNING APPARATUS UTILIZING A LASER BEAM

THE INVENTION

This invention relates to a scanning apparatus which may be utilized, for example, for such purposes as television, computer read-outs and screen display devices. The conventional cathode ray tube which is generally utilized in such devices as noted above, has inherent limitations which make it impractical to enlarge the screen area to any great extent or to be shaped as a flat or so-called wall type of display screen.

It is an object of this invention to provide a scanning apparatus in which the display screen may be greatly enlarged, as compared to the conventional cathode ray tube, without greatly increasing the bulk, thus enabling the entire display apparatus to be generally of minimal thickness.

The above objects are achieved by utilizing a laser beam of the type which is capable of ionizing a gaseous medium which will thus produce an electrically conductive path through the gas. A source of electric power is connected to the conductive path which is then used to conduct the electric power to a fluorescent screen thereby to produce an illuminated dot on the screen. By deflecting the laser beam and thereby the ionized path, and also by modulating the electric power and/or the laser beam an illuminated image will be produced on the screen in the same manner as in the conventional cathode ray tube.

Other features and advantages of the invention will be apparent from the specification and claims when considered in connection with the accompanying drawings in which;

FIG. 1 is a diagrammatic view of the scanning device of my invention.

FIGS. 2 to 4 show modified arrangements of the invention illustrated in FIG. 1.

DESCRIPTION

In FIG. 1 there is shown a laser beam device 1 which directs a beam 10 towards a target or screen comprised of a transparent member 2, such as glass or plastic which is coated with a fluorescent or phosphorescent material 3. Positioned between the laser device 1 and the screen 2 is a transparent conductor plate 5 of such construction that it passes the laser beam. Plate 5 is connected to a source of electrical power 6. The electrically conductive, transparent plate 2 is grounded at 13. Between the plate 5 and screen 2 there is an ionizable gaseous medium which preferably is comprised of a single elemental gas, which, when in an enclosure as shown in FIG. 1, may be under pressure.

Laser beam 10 passes through a deflector 8 positioned between laser device 1 and screen 2. Such deflectors are well known in the art. When the deflector 8 is activated the beam 10 is caused to scan the area of screen 2. As a result of the deflection the electrically conductive path of ionized gas, between plate 5 and screen 2 also will be moved over the screen. Since plate 5 is connected to electric power source 6, electrical contact is provided between the power source 6 and the ionized gaseous path created by the laser beam, and electric current is directed to the spot on screen which is struck by the laser beam. The electrical circuit is thus from the power source 6 to the ionized gaseous path and then to plate 2. By providing a modulator 9 between power source 6 and plate 5, the amount of current directed to the screen 2 may be varied, thereby to vary the intensity of illumination of the particular spot on the screen struck by the laser beam.

In operation, the laser beam is deflected over the screen 2. In passing through the conductive plate 5, the beam will conduct the modulated electrical power to the coating 3 on the screen as if the beam were an electric wire. By modulating the electrical power the amount of current directed to the screen will be varied and thereby produce an illuminated image as desired.

The apparatus shown in FIG. 2 is similar to that shown in FIG. 2 excepting that a modulator 15 for the laser beam is positioned between the laser device 1 and deflector 8. By modulating the beam 10 as well as the electric power, a dual modulating effect is obtained. The beam 10 when modulated will vary the ionization of the gaseous medium and consequently its current carrying capacity. Moreover, the intensity of illumination provided by the light of the beam will be correspondingly varied.

The device shown in FIG. 3 differs from that shown in the other Figures in the provision of a reflecting metal plate 16 which is electrically conductive, and which is connected to power source 6 through the intermediary of modulator 9. The deflected laser beam 10 strikes plate 16 and is then reflected toward screen 2. Plate 16 is merely shown diagrammatically. Its particular construction, it may be flat or curved, and its particular angular disposition are matters of design or choice.

As shown in this Figure the laser beam strikes the metal plate where electrical contact is made, and is deflected and reflected toward screen 2 to carry the modulated electrical power from source 6 to the screen.

In FIG. 4 there is shown a scanning apparatus in which screen 2 may be viewed from one side or the other. This is accomplished by utilizing a reflective metal plate 16' of small size (as compared to plate 16 in FIG. 3) and disposed below the viewing area on screen 2. As with plate 16 of FIG. 3 the plate 16' is shown only diagrammatically since its particular shape and disposition must be such that the beam from laser device 1 will be properly reflected to and moved over screen 2.

In this Figure screen 2 may be transparent as in the other Figures and may be viewed from either side. On the other hand screen 2 may be formed of opaque material (frosted glass, metal, plastic, etc.) in which case the screen may be viewed only from the left hand side (as illustrated in the drawing).

Although the invention has been described by means of specific illustrative examples, it is not intended that the invention be limited thereby. Rather, the invention should be limited only by the appended claims.

I claim:

1. A scanning and display apparatus comprising:
   a phosphorescent target area,
   an ionizable gaseous medium adjacent said target area,
   a laser beam for ionizing said gaseous medium, said laser beam directed through said gaseous medium and toward said target area,
   means for deflecting said laser beam over said target area,
   an electrical power source, means connected to said power source for providing an electrical potential across said ionizable gaseous medium, and means connected to said power source for modulating said electrical potential whereby an electric current is produced through said gaseous medium for impinging upon said phosphorescent target area.

2. A scanning and display apparatus as recited in claim 1 further comprising means for modulating the intensity of said laser beam.

3. A scanning and display apparatus as recited in claim 1 wherein said electrical potential means comprises a transparent electrically conductive plate positioned to intercept said laser beam.

4. A scanning and display apparatus as recited in claim 3 further comprising an enclosure for housing said ionizable gaseous medium.

5. A scanning and display apparatus as recited in claim 1 wherein said electrical potential means comprises an electrically conductive reflective material.

6. A scanning and display apparatus as recited in claim 1 wherein said target area comprises a metallic plate and phosphorescent means on the surface of said metallic plate.

* * * * *